(12) United States Patent
Kritt et al.

(10) Patent No.: US 9,342,514 B2
(45) Date of Patent: May 17, 2016

(54) MULTICULTURAL COLLABORATIVE EDITING METHOD, APPARATUS AND PROGRAM PRODUCT

(71) Applicant: International Business Machines Corporation, Armonk, NY (US)

(72) Inventors: Barry A Kritt, Raleigh, NC (US); Sarbajit K Rakshit, Dusseldorf (GE)

(73) Assignee: International Business Machines Corporation, Armonk, NY (US)

(*) Notice: Subject to any disclaimer, the term of this patent is extended or adjusted under 35 U.S.C. 154(b) by 116 days.

(21) Appl. No.: 13/931,745

(22) Filed: Jun. 28, 2013

(65) Prior Publication Data

US 2015/0006473 A1    Jan. 1, 2015

(51) Int. Cl.
- G06F 17/30  (2006.01)
- G06F 17/24  (2006.01)
- G06F 17/27  (2006.01)
- G06Q 10/10  (2012.01)

(52) U.S. Cl.
CPC ......... *G06F 17/30011* (2013.01); *G06F 17/24* (2013.01); *G06F 17/2785* (2013.01); *G06Q 10/101* (2013.01)

(58) Field of Classification Search
CPC .................. G06Q 10/10; G06F 17/30011
USPC .......................................... 707/608
See application file for complete search history.

(56) References Cited

U.S. PATENT DOCUMENTS

| | | | |
|---|---|---|---|
| 8,266,519 B2* | 9/2012 | Verma et al. ......... | 715/229 |
| 2002/0065848 A1* | 5/2002 | Walker et al. ........ | 707/511 |
| 2010/0268682 A1* | 10/2010 | Lewis et al. ......... | 706/54 |
| 2011/0055336 A1* | 3/2011 | Park et al. ........... | 709/206 |

* cited by examiner

Primary Examiner — Son T Hoang
(74) Attorney, Agent, or Firm — Damion Josephs; Daniel E. McConnell

(57) ABSTRACT

A method, apparatus and program product in which and by which cross-cultural ambiguities in a document data file are identified and collaborative editing of such a document data file by a plurality of editors is enabled to move effectively toward a shared understanding of the intended meaning of a created document.

9 Claims, 3 Drawing Sheets

US 9,342,514 B2

MULTICULTURAL COLLABORATIVE EDITING METHOD, APPARATUS AND PROGRAM PRODUCT

FIELD AND BACKGROUND OF INVENTION

What is here described relates to collaborative editing of document data files and particularly to such editing where there are cultural differences between or among a plurality of editors.

Today, the majority of workplaces are multicultural. Employees in the workplace are more likely to come from different backgrounds including cultural environments and different parts of the world. The textbook, Technical Communication by Paul V. Anderson, makes a point to emphasize cultural differences. It is important to take into account the readers of a document, particularly where collaborative editing is contemplated. By collaborative editing is meant provision for access to a document data file by a plurality of editors (one of whom may be the originating editor) and modification of that document to achieve a final result as a team effort. This is now occurring daily in many businesses.

Matters to which attention must be paid in such a collaborative effort may include:

The amount of detail expected. High-context cultures such as Japan, China, and France provide little detail in their writing. A high-context culture is based on fewer, deeper relations with people; there are many unspoken social rules and understandings within the culture. People in these cultures expect readers to have enough knowledge about the communication before they begin reading. In areas such as instructions, for example, it is assumed that readers have enough background knowledge or experience that there is no need to explain different tools used or walk the reader through any steps. People in low-context cultures such as the United States, Great Britain, and Germany assume readers know very little before they begin reading. Low-context cultures have a greater number of surface-level relations; rules are more explicitly defined so others know how to behave. People in low-context cultures expect detailed writing that explains the entire process.

The distance between the top and bottom of organizational hierarchies. Many organizations in the United States and Western Europe have great distances with many layers between top-level management and low-level workers. When the distance is large, writing to employees above and below tends to be more formal. In cultures where companies are more flatly organized, communication between layers tends to be less formal.

Individual versus group orientation. Many Asian and South American cultures are collectivist, meaning people pursue group goals and pay attention to the needs of the group. In individualistic cultures such as the United States and Northern Europe, people are more interested in personal achievement.

Preference for direct or indirect statements. People in the United States and Northern Europe prefer direct communications, while people in Japan and Korea typically prefer indirect communications. When denying a request in the U.S., a writer will typically apologize, but firmly state that request was denied. In Japan, that directness may seem rude. A Japanese writer may instead write that the decision has not yet been made, delaying the answer with the expectation that the requester will not ask again. In Japan, this is viewed as more polite than flatly denying someone; however, in the United States this may give false hope to the requester, and the requester may ask again.

Basis of business decisions. In the United States and Europe, business decisions are typically made objectively with consideration given to cost, feasibility, timeliness, etc. In Arab cultures, business decisions are often made on the basis of personal relationships.

Interpretation of images, gestures, and words. Words, images, and gestures can mean different things in different cultures. For example, hand gestures are interpreted differently around the world, and graphics showing hands should generally be avoided. Also, religiously affiliated wording can cause offense by readers. "I've been blessed to work with you" and comments that lend themselves to religious references should be avoided.

SUMMARY OF THE INVENTION

As the reader will appreciate, many of the matters and the concerns raised may be identified from linguistic patterns in a written document. Thus, provision can be—and in accordance with what is here described, is—made for identification of patterns which are likely to give rise to cross-cultural misinterpretation of meaning or even insult. What is here described are a method, apparatus and program product in which and by which cross-cultural ambiguities are identified and collaborative editing is enabled to move toward effectively shared understanding of the intended meaning of a created document.

In enabling such collaborative editing, what is here described enables a first collaborative editor to enter an original document data file into an information handling system having a processor, memory and program code executing on the processor. The information handling system may comprise a single machine or a plurality of machines joined together through a network or one or more servers. As here used, the phrase "information handling system" is used to refer to any such arrangement of one or more computer systems which enable collaborative editing. Program code executing on the information handling system then analyzes linguistic patterns in the original data file and identifies (1) a cultural pattern indicative of the cultural background of the first editor and (2) any linguistic pattern in the original data file susceptible to cross-cultural ambiguity. Should such a pattern be identified, then the editor is presented with a question formulated to elicit clarification of the meaning of the identified linguistic pattern susceptible to cross-cultural ambiguity. An answer formulated by the first editor is accepted. Upon a second collaborative editor accessing the original data file for collaborative editing (the second editor having a cultural background differing from that of the first editor), the cultural background of the second editor is identified and a modified document data file linguistically compatible with the cultural background of the second editor is created and displayed to the second editor. Both the original and the modified document data files are stored in memory and accessed by the respective editors as collaborative editing goes forward.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
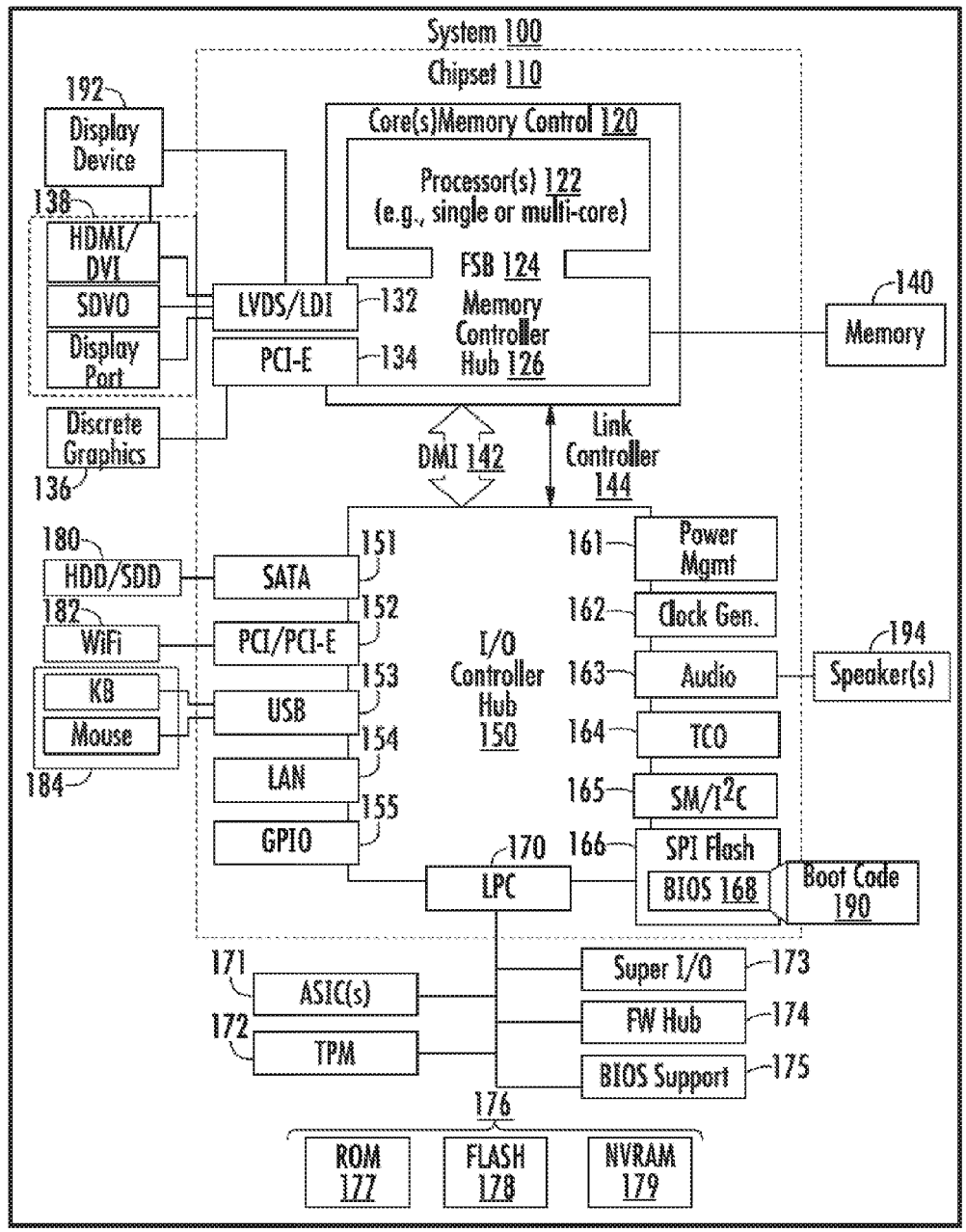
FIG. 1 is a representations of an information handling system on which program code may execute to implement the technology here described.

While various exemplary circuits or circuitry are discussed, FIG. 1 depicts a block diagram of an illustrative exemplary information handling system or computer system 100. The system 100 may be a desktop computer system or a workstation computer; however, as apparent from the description herein, a client device, a server or other machine may include other features or only some of the features of the system 100.

The information handling system 100 of FIG. 1 includes a so-called chipset 110 (a group of integrated circuits, or chips, that work together, chipsets) with an architecture that may vary depending on manufacturer (e.g., INTEL®, AMD®, etc.). The architecture of the chipset 110 includes a core and memory control group 120 and an I/O controller hub 150 that exchange information (e.g., data, signals, commands, etc.) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (e.g., single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (e.g., to provide support for a type of RAM that may be referred to as "system memory"). The memory controller hub 126 further includes a LVDS interface 132 for a display device 192 (e.g., a CRT, a flat panel, a projector, etc.). A block 138 includes some technologies that may be supported via the LVDS interface 132 (e.g., serial digital video, HDMI/DVI, display port). The memory controller hub 126 also includes a PCI-express interface (PCI-E) 134 that may support discrete graphics 136. In FIG. 1, the I/O hub controller 150 includes a SATA interface 151 (e.g., for HDDs, SDDs, etc.), a PCI-E interface 152 (e.g., for wireless connections 182), a USB interface 153 (e.g., for input devices 184 such as keyboard, mice, cameras, phones, storage, etc.), a network interface 154 (e.g., LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (e.g., for speakers 194), a TCO interface 164, a system management bus interface 165, and SPI Flash 166, which can include BIOS 168 and boot code 190. The I/O hub controller 150 may include gigabit Ethernet support.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168. As described herein, a device may include fewer or more features than shown in the system 100 of FIG. 1.

It is to be noted that, as will be appreciated by one skilled in the art, aspects of the present invention may be embodied as a method, apparatus as described above or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are here described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
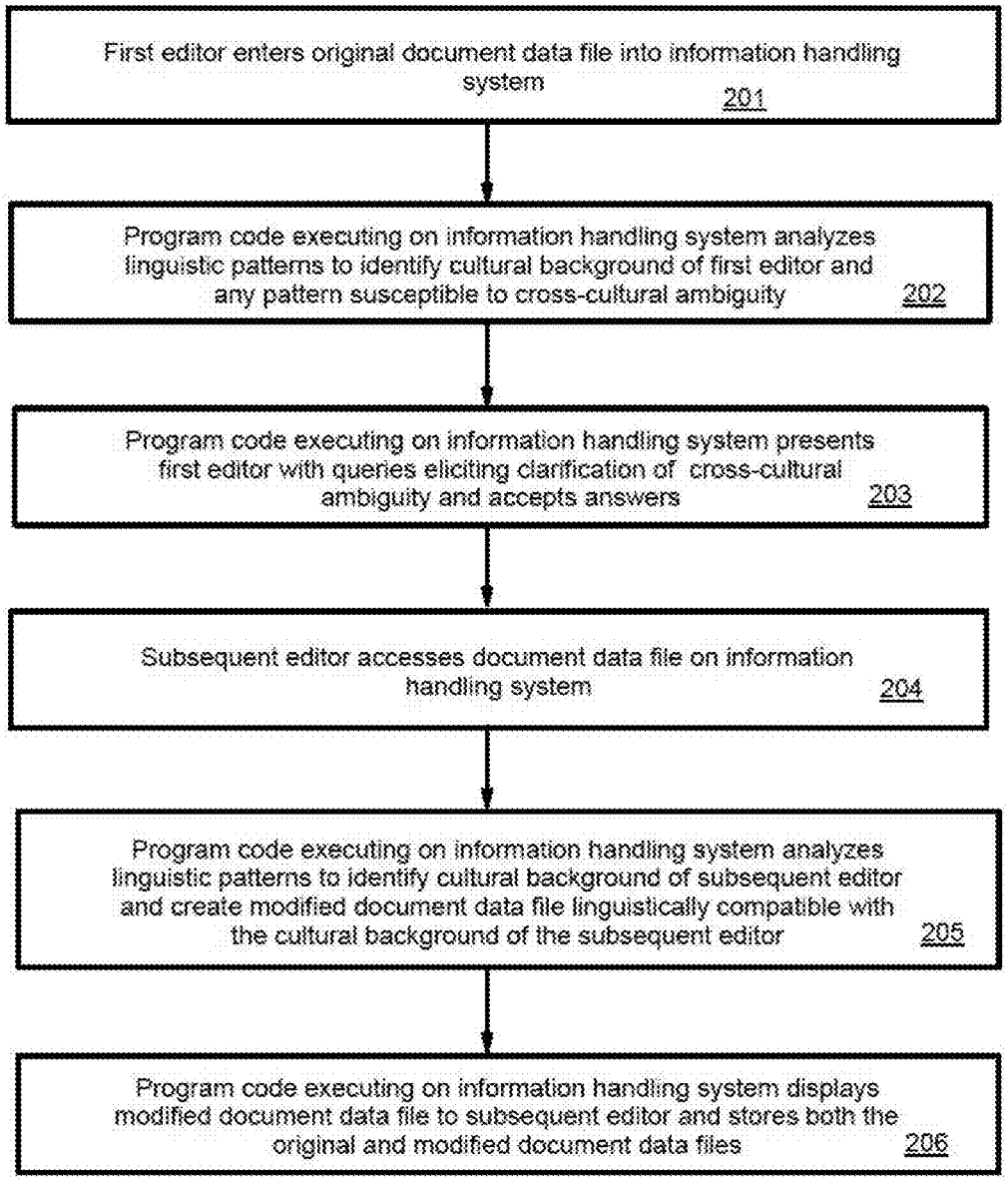
FIG. 2 is a flow chart depiction of steps in a method in accordance with this technology.

Referring now to FIG. 2, a first editor enters a document data file into an information handling system such as the information handling system of FIG. 1 in order to initiate the collaborative editing process (201). Program code executing on the information handling system will analyze the document data file in order to identify from linguistic patterns the cultural background of the entering editor (202). As here used, the word "linguistics" is used in its broad meaning, to refer to such matters, as illustrations and not as limitations, as word choice, word spelling, word order in sentences, grammar, morphology, syntax, semantics and pragmatics. It is known that linguistic pattern both identify a user by cultural background and can lead to misunderstandings across cultures. It is the latter, cross-cultural ambiguity, which the technology here disclosed addresses. Thus the program code executing on the information handling system, in analyzing the document data file, will identify a pattern or patterns susceptible to cross-cultural ambiguity. The analysis uses a set of semantic rules derived from the culturally dependent linguistic patterns of the editor. The set of rules may also be derived from shared linguistic patterns, such as technical descriptions, with an organization of which the anticipated editors are members.

Where such cross-cultural ambiguity is detected (as will be almost inevitably the case with collaborative editing across cultures), the entering editor is queried (203) to elicit clarification of the meaning underlying the ambiguous linguistic pattern or patterns. This may involve multiple queries. As these are answered by the editor, the answers are taken into account for future modification of the document data file.

As collaborative editing proceeds, a subsequent—second or following—editor will access the document data file (204). On such access, the program code identifies the cultural background of the subsequent editor and will create, using the original document data file and the answers to the queries about cross-cultural ambiguities, a modified document data file compatible with the cultural background of the subsequent editor (205). This process of revision may be iterated as many times as necessary when the collaborative editing is among a large group of editors. The modified document data file will be displayed to the subsequent editor (206) and both the original and the modified document data files will be stored in the information handling system. Thus subsequent editors from a common cultural background will view a display of a document data file attuned to their cultural sensitivities.

The diagrams and flowchart in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
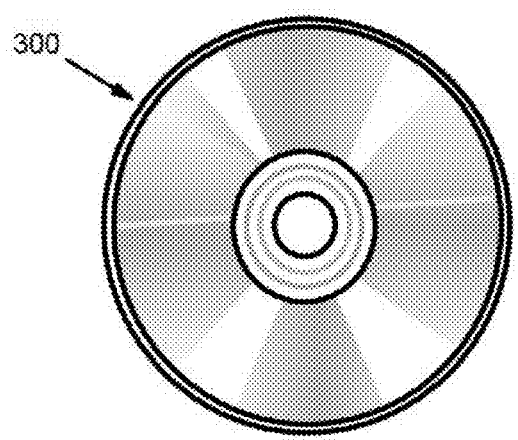
FIG. 3 is a representation of one form of a computer readable storage medium on which program code executable on an information handling system such as that of FIG. 1 may be stored.

As described above, the program code executing on the information handling system as the process proceeds may be stored accessibly to the information handling system on a computer readable medium such as the optical disc 300 shown in FIG. 3.

In the drawings and specifications there has been set forth a preferred embodiment of the invention and, although specific terms are used, the description thus given uses terminology in a generic and descriptive sense only and not for purposes of limitation.

What is claimed is:

1. A method for multi-cultural collaborative editing, the method comprising:
   entering into an information handling system, having a processor, memory and program code executing on the processor, an original document data file created by a first collaborative editor;
   executing the program code by the processor to:
      analyze linguistic patterns in textual data of the original document data file entered by the first editor and identify a cultural pattern indicative of a cultural background of the first editor;
      identify a linguistic textual pattern in the original document data file entered by the first editor susceptible to cross-cultural ambiguity using a set of semantic rules, wherein the cross-cultural ambiguity indicates textual ambiquity in written languages of at least two different cultures;
      present a series of questions formulated to elicit clarification of meaning of the identified linguistic pattern to the cultural background of the first editor; and
      accept answers to the presented series of questions formulated and entered by the first editor;
   responding to an access to the original document data file by a second editor for collaborative editing by accepting the access, the second editor having a cultural background differing from the cultural background of the first editor by executing the program code by the processor to:
      identify a cultural pattern indicative of the cultural background of the second editor;
      create a modified document data file linguistically compatible with the cultural background of the second editor with reduced textual cross-cultural ambiguity by using the textual data of the original document data file and the answers to the presented series of questions;
      display the modified document data file to the second editor; and
      store in the memory both the original document data file and the modified document data file.

2. The method according to claim 1, wherein the analysis of the entered original document data file uses the set of semantic rules derived from shared linguistic patterns of an organization of which the editors are members.

3. The method according to claim 1, wherein at least three collaborative editors access the original document data file and further wherein execution of the program code distinguishes among cultural patterns indicative of a respective cultural background of each of the three editors and creates a plurality of modified document data files, each being linguistically compatible with the respective cultural background of a corresponding one of the three editors and each being separately stored in the memory.

4. An apparatus for multi-cultural collaborative editing comprising:
   an information handling system having a processor, memory and program code executing on the processor, wherein at least one of the processor and memory is implemented at least partially by hardware;
   the program code, when executing on the information handling system:
      accepting entrance by a first collaborative editor of an original document data file;
      analyzing linguistic patterns in textual data of the original document data file entered by the first editor and identify a cultural pattern indicative of a cultural background of the first editor;
      identifying a linguistic textual pattern in the original document data file entered by the first editor susceptible to cross-cultural ambiguity using a set of semantic rules, wherein the cross-cultural ambiguity indicates textual ambiguity in written languages of at least two different cultures;
      presenting a series of question formulated to elicit clarification of meaning of the identified linguistic pattern to the cultural background of the first editor; and
      accepting answer to the presented series of questions formulated and entered by the first editor;
      responding to an access to the original document data file by a second editor for collaborative editing by accepting the access, the second editor having a cultural background differing from the cultural background of the first editor:
      identifying a cultural pattern indicative of the cultural background of the second editor;
      creating a modified document data file linguistically compatible with the cultural background of the second editor with reduced textual cross-cultural ambiguity by using the textual data of the original document data file and the answers to the presented series of questions;
      displaying the modified document data file to the second editor; and
      storing in the memory both the original document data files and the modifies document data file.

5. An apparatus according to claim 4, wherein the program code, when analyzing the entered document data file, uses the set of semantic rules derived from shared linguistic patterns of an organization of which the editors are members.

6. The apparatus according to claim 4, wherein the program code accommodates at least three collaborative editors accessing the original document data file and further wherein the program code distinguishes among cultural patterns indicative of a respective cultural background of each of the three editors and creates a plurality of modified document data files, each being linguistically compatible with the cultural background of a corresponding one of the three editors and each being separately stored in the memory.

7. An program product comprising:
   a non-transitory computer readable storage medium;
   program code stored on the computer readable storage medium which, when executing on an information handling system having a processor and memory:
      accepts entrance by a first collaborative editor of an original document data file;

analyzes linguistic patterns in textual data of the original document data file entered by the first editor and identify a cultural pattern indicative of a cultural background of the first editor;

identifies a linguistic textual pattern in the original document data file entered by the first editor susceptible to cross-cultural ambiguity using a set of semantic rules, wherein the cross-cultural ambiguity indicates textual ambiguity in written languages of at least two different cultures;

presents a series of questions formulated to elicit clarification of meaning of the identified linguistic pattern to the cultural background of the first editor; and accepts answer to the presented series of questions formulated and entered by the first editor;

responds to an access to the original document data file by a second editor for collaborative editing by accepting the access, the second editor having a cultural background differing from the cultural background of the first editor:

identifies a cultural pattern indicative of the cultural background of the second editor;

creates a modified document data file linguistically compatible with the cultural background of the second editor with reduced textual cross-cultural ambiguity by using the textual data of the original document data file and the answers to the presented series of questions;

displays the modified document data file to the second editor; and stores in the memory both the original document file and the modified document data file.

8. The program product according to claim 7, wherein the program code, when analyzing the entered document data file, uses the set of semantic rules derived from shared linguistic patterns of an organization of which the editors are members.

9. The program product according to claim 7, wherein the program code accommodates at least three collaborative editors access the original document data file and further wherein execution of the program code distinguishes among cultural patterns indicative of a respective cultural background of each of the three editors and creates a plurality of modified document data files, each being linguistically compatible with the cultural background of a corresponding one of the three editors and each being separately stored in the memory.

\* \* \* \* \*